United States Patent
Hoffmann et al.

(10) Patent No.: US 7,880,345 B2
(45) Date of Patent: Feb. 1, 2011

(54) LINEAR ACTUATOR SYSTEM AND METHOD

(75) Inventors: Benjamin Ralph Hoffmann, Minnetonka, MN (US); William Joseph Zerull, Minneapolis, MN (US); Richard Harley Welch, Jr., Oakdale, MN (US)

(73) Assignee: Exlar Corporation, Chanhassen, MN (US)

( * ) Notice: Subject to any disclaimer, the term of this patent is extended or adjusted under 35 U.S.C. 154(b) by 589 days.

(21) Appl. No.: 11/784,535

(22) Filed: Apr. 5, 2007

(65) Prior Publication Data

US 2008/0048514 A1 Feb. 28, 2008

Related U.S. Application Data

(60) Provisional application No. 60/790,930, filed on Apr. 11, 2006.

(51) Int. Cl.
*H02K 41/02* (2006.01)

(52) U.S. Cl. .................. 310/12.13; 310/12.14

(58) Field of Classification Search .............. 310/12.01, 310/12.13–14; 192/3.62; 74/473.19
See application file for complete search history.

(56) References Cited

U.S. PATENT DOCUMENTS

| | | | |
|---|---|---|---|
| 51,815 A | 1/1866 | Eads | |
| 1,232,244 A | 7/1917 | Dick | |
| 3,927,436 A * | 12/1975 | Inoue et al. | 15/250.17 |
| 4,809,824 A * | 3/1989 | Fargier et al. | 188/72.8 |
| 5,036,939 A | 8/1991 | Johnson et al. | |
| 5,307,911 A | 5/1994 | Robinson | |
| 5,310,387 A * | 5/1994 | Savagian | 475/5 |
| 5,971,123 A | 10/1999 | Ochab et al. | |
| 6,453,793 B1 * | 9/2002 | Simonds | 91/345 |
| RE38,012 E | 3/2003 | Ochab et al. | |
| 6,622,837 B2 | 9/2003 | Ochab et al. | |
| 6,629,590 B2 | 10/2003 | Ochab et al. | |
| 6,655,515 B2 | 12/2003 | Cox et al. | |
| 6,722,484 B2 | 4/2004 | Ochab et al. | |
| 2002/0056601 A1* | 5/2002 | Inoue | 192/3.62 |
| 2003/0094057 A1* | 5/2003 | Bigi | 74/473.37 |
| 2003/0213668 A1* | 11/2003 | Stevenson | 192/48.2 |
| 2004/0013764 A1* | 1/2004 | Dantlgraber | 425/574 |
| 2004/0070287 A1* | 4/2004 | Corbett et al. | 310/12 |
| 2006/0016662 A1* | 1/2006 | Baehr et al. | 192/85 CA |
| 2007/0144279 A1* | 6/2007 | Wu et al. | 74/22 A |
| 2009/0021092 A1* | 1/2009 | Elliott et al. | 310/83 |

* cited by examiner

*Primary Examiner*—Thanh Lam
(74) *Attorney, Agent, or Firm*—Merchant & Gould P.C.

(57) ABSTRACT

A linear actuator system is described that includes a linear actuator, a first motor, and a second motor. The linear actuator is configured to transmit rotational motion to linear motion. The first motor is operatively connected to the linear actuator. The second motor is also operatively connected to the linear actuator. The first motor is configured to provide a different amount of force and a different speed to the linear actuator than the second motor. Methods of operating a linear actuator are also disclosed.

24 Claims, 10 Drawing Sheets

LINEAR ACTUATOR SYSTEM AND METHOD

CROSS REFERENCE TO RELATED APPLICATIONS

This application claims priority to U.S. Provisional Patent Application No. 60/790,930, entitled "Method and Apparatus For Linear Actuator with Two Motors, One For High Speed And One For High. Force" filed Apr. 11, 2006.

FIELD OF THE INVENTION

The present invention relates generally to linear actuators; relates more specifically to driving a linear actuator with two motors via a transmission; and relates more specifically still to driving a rotational to linear actuator with both a high torque motor and a high speed motor using a bi-directional over-running clutch.

BACKGROUND OF THE INVENTION

There are many applications that require a linear actuator to both move at high speed with low force, and at low speed with high force. An example application might be a nailing machine, or a riveting or metal pressing machine. The desired machine would rapidly move the ram or rod of the linear actuator with high speed to the point where high force is needed. This first part of the cycle does not itself require high force. This first part of the cycle is typically followed by a need for a short stroke at high force (to insert a rivet or a nail for example). There are other applications that may require a different sequence of high speed and high force moves, but many of these are similar in that a single actuator needs to perform both types of motion.

For a linear actuator to meet both the high speed and high force (or torque) requirements using a single motor, the motor must be capable of high power (power is proportional to speed×force for linear motion, or proportional to rpm×torque for the motor's rotary input to a screw type actuator). A high power motor will generally cost more and be larger than a lower power motor, and if drive electronics are required, their cost and size will also typically be greater as power is increased.

One solution to this problem is to use separate actuators, one for high force and another for high speed applications. Another solution might be to use a transmission of some sort to change the output of a motor from low torque and high speed to high torque and low speed, perhaps with a two-speed gear box, or a continuously variable belt drive transmission (CVT) for example. These solutions can require expensive or complicated mechanisms, and often require active electronic control. These solutions may require speed changes or stoppage of the actuator (from what would otherwise be a continuous motion) to implement a torque change, or may require sensing the load change to actively shift speeds, or to actuate a shift mechanism in a transmission, or to programmatically actuate a change in a CVT ratio at a given actuator location in temporal anticipation of a load increase at a given location, or to otherwise control the system.

Therefore, there is a need in the art for a method, apparatus and system for driving a linear actuator with two motors via a transmission in order to provide both high speed and high force or torque as needed. The invention should also preferably overcome the drawbacks associated with the foregoing systems and methods. Aspects of the present invention overcome these and other shortcomings of the prior art and address these needs in the art.

SUMMARY OF THE INVENTION

The linear actuator system and method according to the present invention utilizes two motors, the power of which together could sum to a total power requirement less than a single larger motor that would be capable of providing both the high speed and high force requirements. Each motor is connected to a linear actuator through a transmission which allows both motors to operate.

The first motor, referred to herein as the high torque motor, is connected to the linear actuator input shaft through the low speed connection/input of a bi-directional over-running (BDOR) clutch of the transmission. The second motor, which may be referred to herein as a high speed motor, is connected to the linear actuator input shaft through the over-running input (i.e., high speed connection) of the bi-directional over-running clutch. The over-running input transmits force and torque as if the high speed motor was directly connected to the input shaft of the linear actuator.

According to one aspect of the present invention, the speed and torque changes happen automatically when the load requires high force, are mechanically implemented, do not require elaborate electronic controls (but may use them for enhanced performance), and do not require anticipating the change and/or a significant amount of time to engage or sequence the two motors. The system and method of the present invention responsively reacts to sudden or gradual changes in force required by the load on the linear actuator and provides motion occurring in either direction at any speed. Additional servo controls, or other controls, may be added to further enhance the performance of the system, but are not required for the basic system of the invention to work.

Therefore, according to one aspect of the invention, there is provided a linear actuator system comprising: a linear actuator configured to transmit rotational motion to linear motion; a first motor operatively connected to the linear actuator; and a second motor operatively connected to the linear actuator; wherein the first motor is configured to provide a different amount of force and a different speed to the linear actuator than the second motor.

According to another aspect of the invention, there is provided a method of operating a linear actuator, the method comprising the steps of: operatively connecting a first motor to the linear actuator; and operatively connecting a second motor to the linear actuator, wherein the second motor is configured to provide a different amount of force and a different speed on the linear actuator than the first motor.

According to other aspects of the invention described in connection with the preceding two paragraphs, there is further provided a transmission for connecting the first and second motors to the linear actuator; and further wherein the transmission includes a bidirectional over-running clutch with a high speed input and a low speed input, such that the first motor is connected to the linear actuator through the low speed input of the clutch and the second motor is connected to the linear actuator through the high speed input of the clutch.

According to yet another aspect of the invention, there is provided a linear actuator system comprising: means for generating a first rotational torque having a first speed; means for generating a second rotational torque having a second speed; and means for transforming the first and second rotational torques into a linear force.

While the invention will be described with respect to preferred embodiment configurations, it will be understood that the invention is not to be construed as limited in any manner by such configurations described herein. Instead, the principles of this invention extend to any environment in which an actuator is driven with both a high torque motor and a high speed motor using a bi-directional over-running clutch. These and other variations of the invention will become apparent to those skilled in the art upon a more detailed description of the invention.

The advantages and features which characterize the invention are pointed out with particularity in the claims annexed hereto and forming a part hereof. For a better understanding of the invention, however, reference should be had to the drawings which form a part hereof and to the accompanying descriptive matter, in which there is illustrated and described a preferred embodiment of the invention.

BRIEF DESCRIPTION OF THE DRAWINGS

In the drawings in which like elements are identified with the same designation numeral.

DETAILED DESCRIPTION

Figure 1:
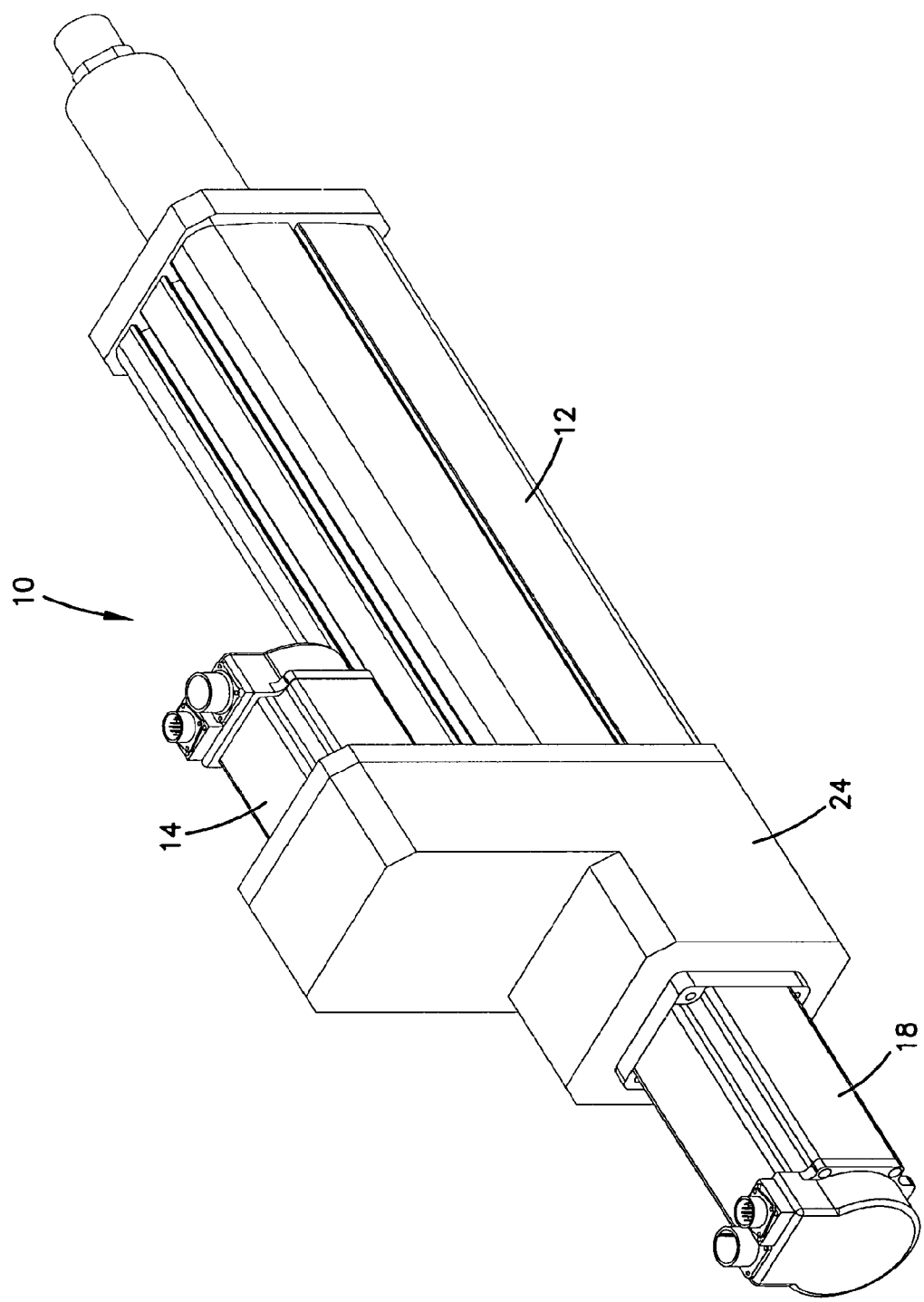
FIG. 1 is a perspective view of the linear actuator system according to the present invention.
Figure 2:
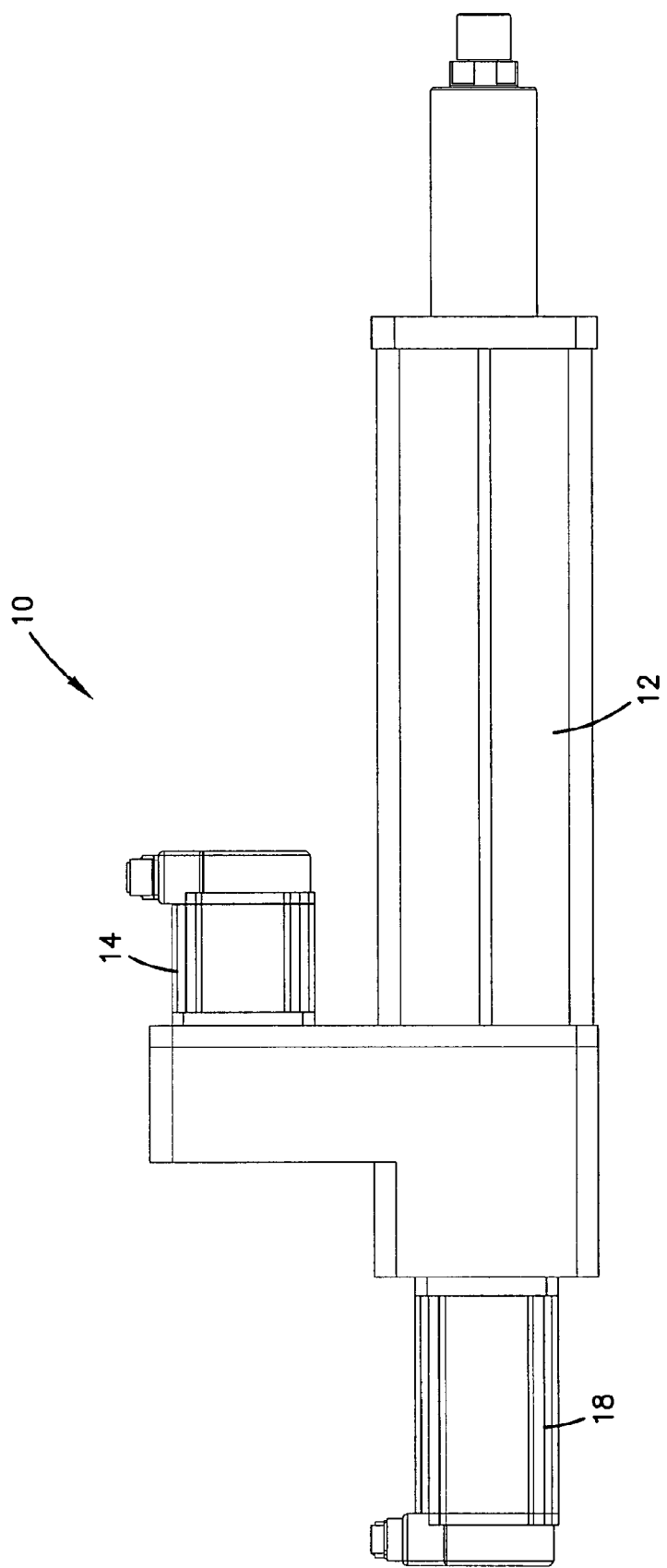
FIG. 2 is a side elevational view of the linear actuator system of FIG. 1.
Figure 3:
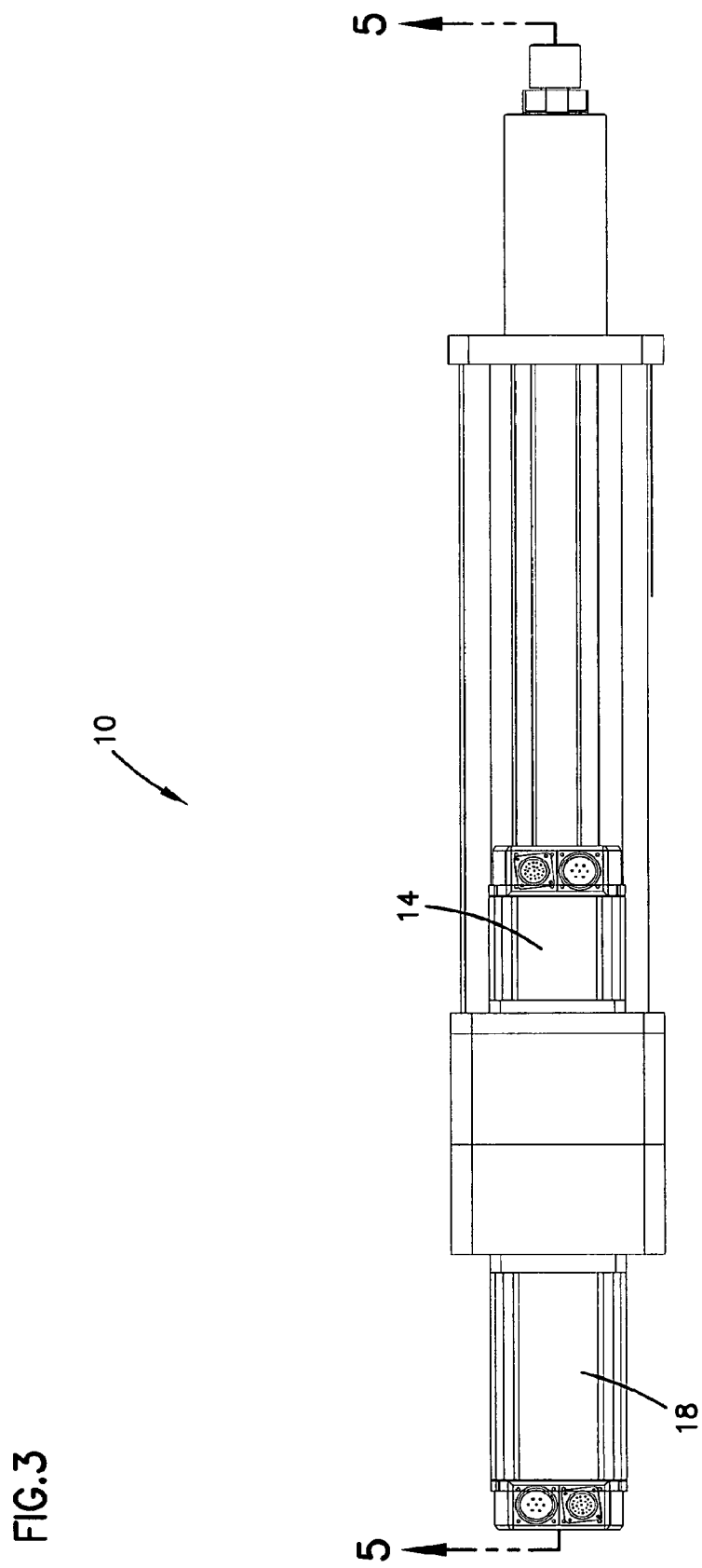
FIG. 3 is top plan view of the linear actuator system of FIG. 1.

Referring first to FIGS. 1-5, a linear actuator system 10 according to the principles of the present invention is shown. The linear actuator system 10 includes a linear actuator 12, a first motor 18 operatively connected to the input shaft 16 of the linear actuator 12 and a second motor 14 operatively connected to the input shaft 16 of the linear actuator 12. This arrangement allows the actuator 12 to operate in two modes: either high speed and low force, or low speed and high force. The actuator 12 can automatically switch modes in response to changes in load and speed behavior.

The first and the second motors 18, 14 are operatively connected to the input shaft 16 of the linear actuator 12 through a transmission 20. In the depicted preferred embodiment of the system 10, the transmission 20 includes a bi-directional over-running (BDOR) clutch 22. The linear actuator 12 is a rotational to linear motion type actuator. An internal threaded drive shaft 30 is rotated along its longitudinal axis by the input shaft 16 (best seen in FIG. 5). Roller assemblies 31 engage the threaded drive shaft 30 and transmit the rotation to the internally threaded cylinder 32. Internally threaded cylinder 32 is precluded from rotating, and so moves in a linear direction as indicated by the arrow designated 33 in FIG. 5. Such actuators are commercially available under the I Series designation, and are manufactured by Exlar Corporation of Chanhassen, Minn.

Figure 4:
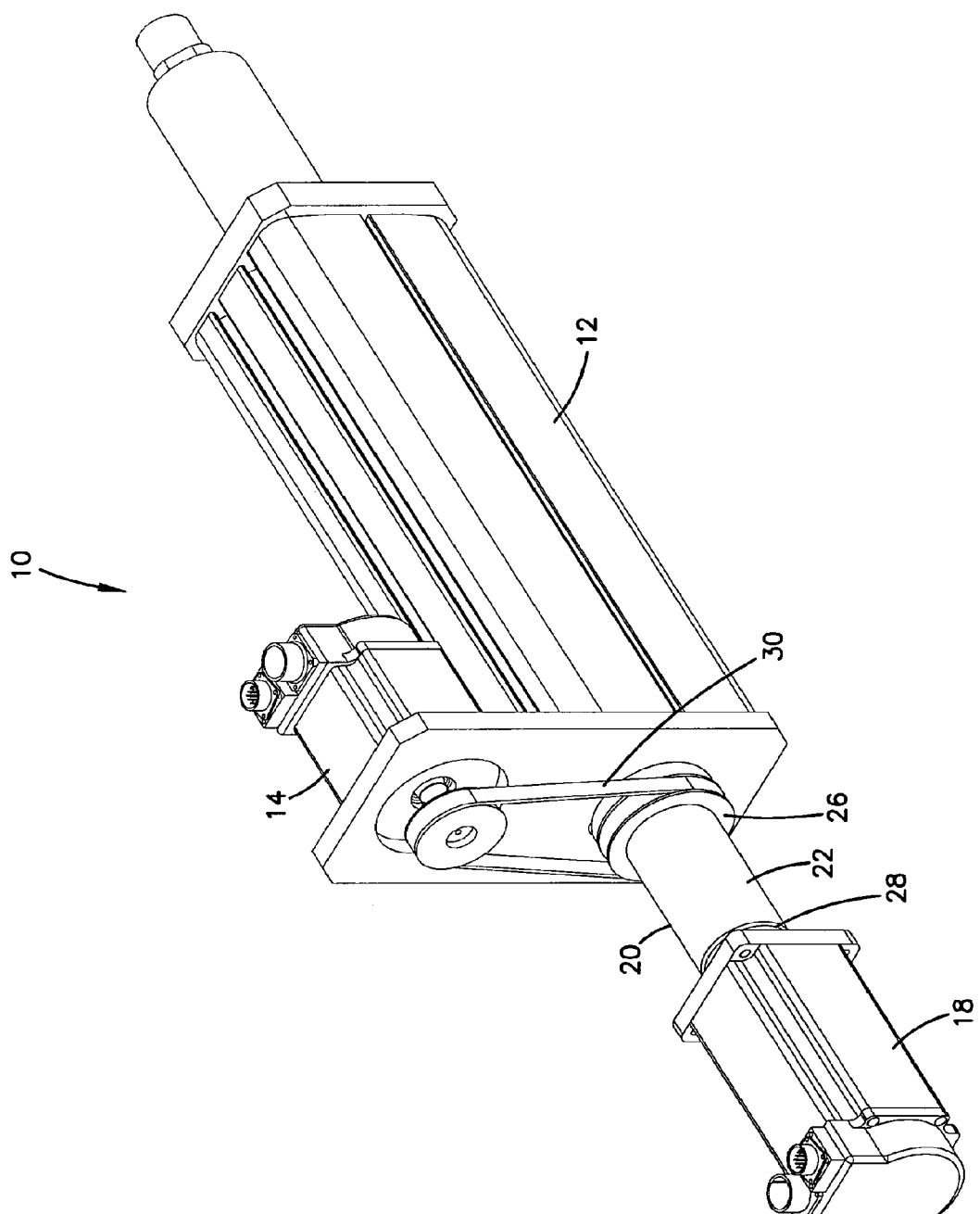
FIG. 4 is a perspective view of the linear actuator system of FIG. 1, shown with the casing of the transmission removed from the system illustrating the internal components of the transmission.
Figure 5:
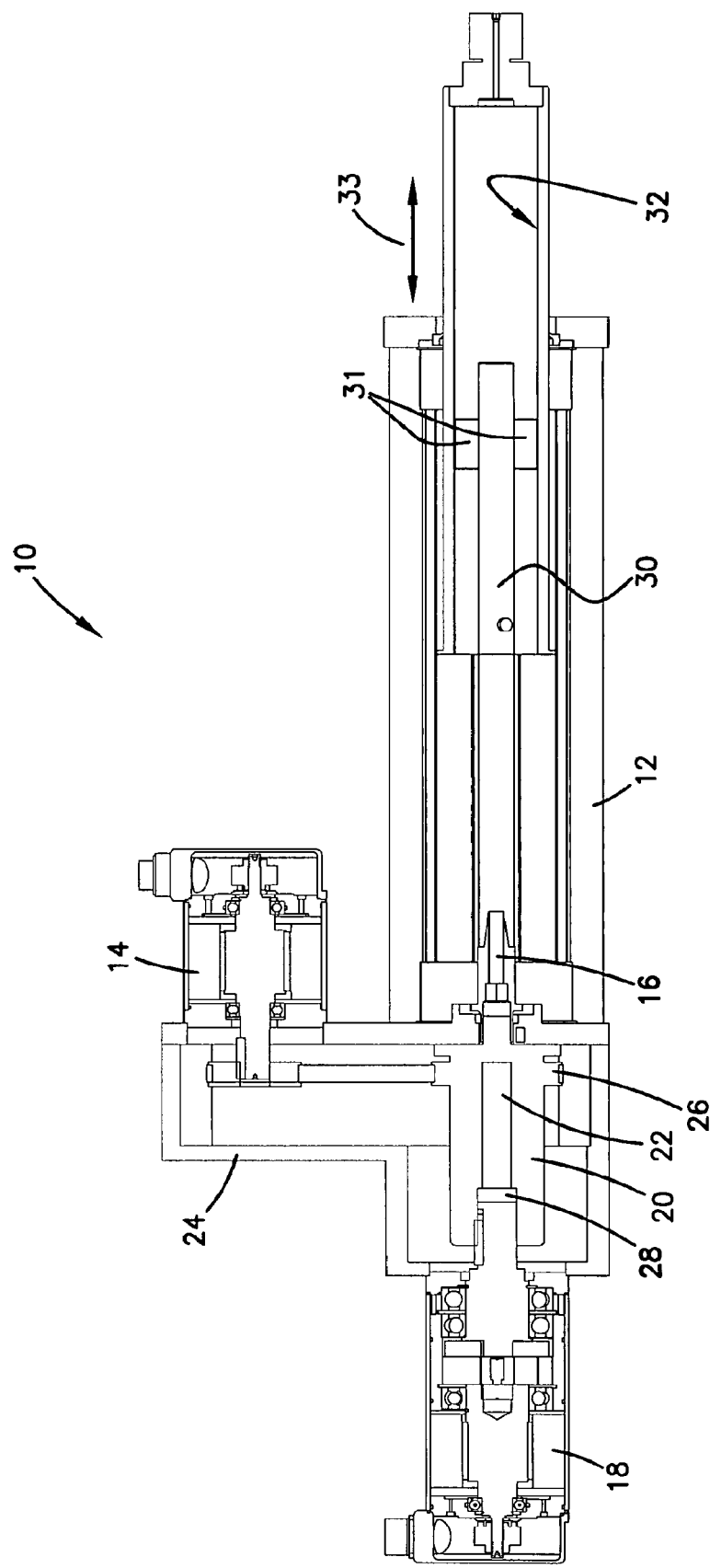
FIG. 5 is a cross-sectional view taken along line 5-5 of FIG. 3.

Referring now to FIGS. 4 and 5, the system 10 is shown without a casing 24 of the clutch 22 to further illustrate the BDOR clutch 22. Bi-directional over-running clutches are a known technology, but may be of generally limited commercial availability, and are generally customized for a particular application. One example of a BDOR clutch 22 suitable for use in the present system is a Hilliard Bidirectional Over-runnning Clutch available from The Hilliard Corporation located in Elmira, N.Y.

For a detailed description of a BDOR style clutch, reference may be had, for example, to U.S. Pat. No. 6,655,515; U.S. Pat. No. 5,307,911; and U.S. Pat. No. 5,036,939. However, a brief description of a BDOR clutch is provided herein for convenience.

Overrunning roller clutches are typically arranged and configured to include an intermittent friction apparatus operative between a roller cage and a housing—wherein the cylindrical housing is attached to an output shaft. When friction is present, rotation of the cage with respect to the housing is retarded, and so moves the roller cage (and respective rollers) to a forward or reverse engagable position. The force is applied in an intermittent nature wherein when the input shaft is not rotating faster than the housing, no friction is present and the roller cage (and respective rollers) are returned to a central, neutral position, by a circumferential spring.

The input shaft generally includes a periphery about which the rollers are located. More specifically, the periphery is generally a polygon with each face of the polygon having a respective roller. The angles between faces of the polygon form camming surfaces. In this manner, the forward and reverse engagable positions are defined when the rollers approach the camming surfaces and become wedged. The neutral position is defined when the rollers return to the center of the respective polygon face.

Returning now to a description of the system, it will be appreciated that the resulting system 10 uniquely offers two performance characteristics that are valuable in certain important linear actuator applications: 1) high speed with low force, and 2) low speed with high force, while using motors that are relatively small. Normally, achieving the above performance characteristics would require driving a linear actuator with a single, very much larger motor.

The second motor 14 of the system 10 may be referred to herein as a high speed motor. The high speed motor 14 is connected to the linear actuator input shaft 16 through an over-running input 26 (i.e., high speed connection) of the BDOR clutch 22. See FIGS. 4 and 5. The over-running input 26 of the clutch 22 transmits force and torque as if the motor 14 was directly connected to the input shaft 16 of the linear actuator 12.

The first motor 18 may be referred to herein as the high torque motor. The high torque motor 18 is connected to the linear actuator input shaft 16 through a low speed connection/input 28 of the bi-directional over-running clutch 22.

The system 10 of the present invention may use two commercially available rotary drive motors to provide torque to a commercially available linear actuator, which converts the rotary motion into linear motion. An example high speed motor 14 generating high speed output suitable for use with the system 10 may be available from Exlar Corp. under the model designation of SLM Series servo motors. In one embodiment, the high speed motor 14 may have a peak speed of 4000 rpm and maximum continuous torque of 55 lbs-in.

An example high torque motor 18 generating high torque output at (typically) lower speed suitable for use with the system 10 may be available from Exlar Corp. under the model designation of SLG Series servo motors. In one embodiment, the high torque motor 18 may have a peak speed of 400 rpm, and a maximum continuous torque of 550 lbs-in.

The output from the two motors 14, 18 is combined and selected by coupling the motors 14, 18 with the BDOR clutch 22. The output from this clutch 22 is input to the linear actuator 12. As noted above, an example linear actuator suitable for use with the system 10 may be a commercially available actuator from Exlar Corp. under the model designation of I Series actuators.

Referring to FIG. 4, the high speed motor 14 is shown coupled with a belt drive 30 to the over-running connection 26 of the bi-directional over-running clutch 22. The low speed high torque motor 18 is shown directly coupled to the inner, high torque input 28 of the bi-directional over-running clutch 22. It should be understood that various alternative motor mounting and coupling means are possible. For example, either motor 14, 18 (or both motors) could be coupled to the clutch 22 via drive belts or gear trains, etc. Also, the bi-directional over-running clutch 22 can be made to have its inner or outer member be the over-running member—thus creating more coupling alternatives. In FIG. 4, the integration housing/casing 24, which supports the connection of the two motors 14, 18, the clutch 22, and the linear actuator 12, is shown removed from the system 10 to illustrate the inner components of the transmission 20.

By way of example, the high speed motor 14 may be a typical servo motor, running at 4000 rpm. Also, for example, the high torque motor 18, may actually be comprised of an identical servo motor with a planetary gear reducer mounted on it, providing an output of 400 rpm at approximately ten times the torque (less a slight amount due to mechanical efficiency considerations) of the high speed motor 14. Without the principles of the present invention, a system using a single motor having both the high speed and high torque requirements would need a motor that would be sized to approximately provide ten times the amount of torque normally provided at the higher speed. Such a system represents a significant cost and size increase for both the motor and any required motor drive electronics.

During the operation of the linear actuator system 10, the first and the second motors 14, 18 both run at the same time. During high speed operation of the linear actuator system 10, the high speed motor 14 runs faster than the high torque motor 18, and thus controls the motion of the linear actuator 12. The high torque motor 18 runs slower, and, thus, has no influence on the actuator 12 because of its connection through the over-running clutch 22.

Figure 9:
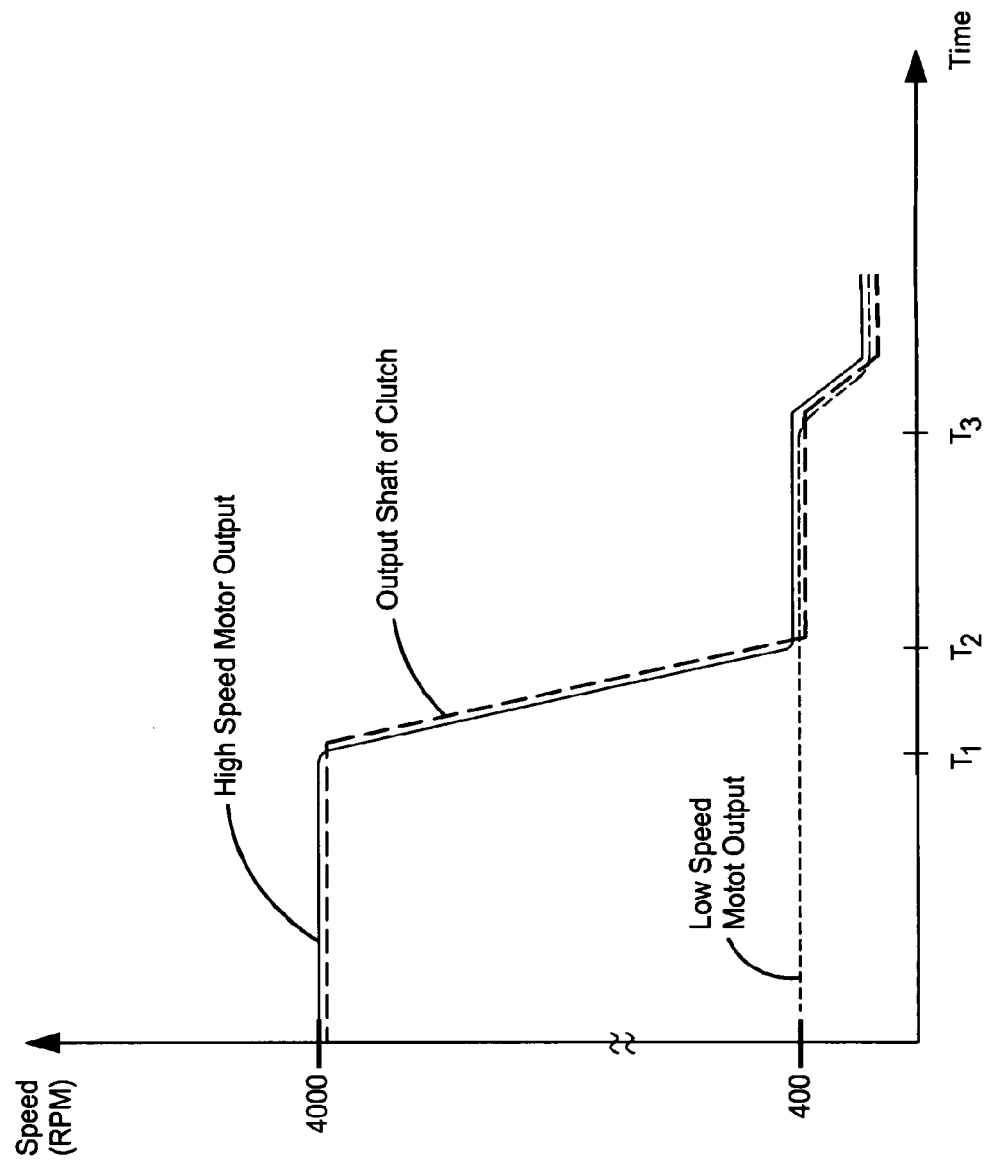
FIG. 9 is a graph illustrating the input speeds of the clutch and the resulting output speed.

Turning briefly to FIG. 9, the operation of the output or overrunning shaft of the clutch is shown as corresponding to the output of the high speed motor 14 from time 0 to time T1 where the motor begins to slow. At time T2, the high speed motor has reached a lower speed which is exceeded by the low speed motor 18. Accordingly, the shaft speed of the low speed motor 18 now controls the output. At time T3, the low speed motor 18 slows further and so still controls the output. It should be noted that the illustration shows the three graphed speeds as slightly separated when at the same speed for purposes of clarity and not to indicate that there is an actual difference in speeds.

When the linear actuator 12 encounters a high force/load, requiring, for example, a high torque driving force, the high speed motor 14 would stall, or otherwise cease to provide adequate torque (the high speed motor 14 could be current-limited to protect the stator for example). The high speed motor 14 may, depending on ancillary controls, continue to provide some or none of the total input torque required. Thus, the linear actuator 12 would slow down (perhaps rapidly, depending on inertia, electronic control, etc.), until the required input speed was slow enough for the high torque motor 18 connected to the low speed input 28 of the BDOR clutch 22 to engage, and thus provide a high torque input to the linear actuator input shaft 16. It will be appreciated that a controller may slow down the high speed motor 14 prior to encountering the high force/load in order for the high torque motor 18 to provide torque to the input shaft 16. The high torque motor 18 will engage when the speed of the high torque motor 18 exceeds that of the high speed motor 14.

This transition from high speed, low force to low speed, high force motion occurs automatically through the normal operation of the BDOR clutch 22. In the depicted embodiment, the system does not require ancillary controls to actuate this change. Similarly, if the force resisting the motion of the linear actuator 12 were to decrease to a point where the torque provided by the high speed motor 14 was adequate to advance the actuator 12, then the over-running aspect of the BDOR clutch 22 would allow the high speed motor 14 to accelerate to a higher speed (perhaps its full speed depending on the speed-torque characteristics of the motor 14 and the speed-force characteristics of the force resisting the motion of the linear actuator 12). Thus, the transition from high speed, low force to low speed, high force mode of operation is reversible (while the actuator 12 is continuously advancing in the same direction), and can be repeated as often as needed, and may occur without input from the motors' control system.

Continuing with the above example, thus, when the high speed motor 14 regains its full speed, the linear actuator 12 would advance rapidly, at approximately ten times the speed it operates in the slow mode. When operated in the slow mode, the linear actuator 12 could exert approximately ten times the force it can during the high speed mode, utilizing the torque from the high torque motor 18. It should be understood that this idealized example ignores the small effects of losses due to efficiency considerations.

If the high speed motor 14 was operated under suitable controls, it could continue to apply its torque to the linear actuator 12 when the system 10 is operating in the high force mode. In this case, for the above example, the total available torque in the high force mode would be about eleven times the torque of the high speed mode.

When the linear actuator 12 needs to operate in the reverse direction, the first and second motors 14, 18 can simply reverse their operating direction. Depending on the specific characteristics of the BDOR clutch 22, it may be necessary to stop or reverse the high torque motor 18 first, to allow the clutch 22 to return to a neutral operating mode, so that the over-running clutch behavior can be realized when the high speed motor 14 is now operated in reverse. A Hilliard brand BDOR clutch may typically need approximately fifteen degrees of reverse shaft rotation of the high torque, slow speed motor 18 (while the overrunning shaft is idle) to reset the clutch 22 to the neutral position for proper operation in the reverse direction. This brief sequence of control over motor motion might be needed to unlock the clutch 22 to prepare it for proper operation in the reverse direction. Once operating in the reverse direction, the linear actuator 12 will have the same behavior as in the forward direction, because of the bi-directional symmetry of the BDOR clutch 22.

The controls for this system 10 could be conventional controls. For example, brush type servo motors could be used, requiring only a voltage source of a given polarity to operate the motors in a given direction. Limit switches attached to the linear actuator could directly operate the power provided to the first and second motors 14, 18 to switch polarity and cause the linear actuator 12 to operate in a repeat cycle mode, for example. Alternatively, limit switches could operate relays, or programmable relays, or be used as input signals to a PLC or a motion controller, which could, in turn, operate the motors 14, 18 according to some predetermined motion profile or cycle as desired. Similarly, other forms of input could be used, such as proximity switches, or load sensors, etc. The variety of choices for controls is very broad and would depend on the nature of each specific application.

Servo controls might also be used to further enhance the system performance. For example, by purposefully reducing the torque output from the high speed motor 14, the system 10 could be caused to shift from a high speed mode to a high force mode, without the need for an increase in the actuator's load to trigger this change. This type of a control might be useful if one wanted to transition to high force mode prior to encountering a load.

According to yet another variation of the invention, one may use a BDOR clutch that is electrically actuated. A typical BDOR clutch (e.g., a Hilliard BDOR clutch) is self actuated by the relative motion of the internal parts—and this requires a certain amount of friction. The friction can be minimized by using an electromagnet to cause the BDOR clutch to properly engage as an over-running clutch. When the electromagnet is off, there is no friction and the clutch will tend not to shift at all. In this variation, the clutch would be controlled with an electrical signal.

Also, upon reversal of linear actuator 12 direction, if the high torque motor 18 is required to reverse prior to the high speed motor 14 reversal for proper operation of the BDOR clutch 22 (or if any other predetermined relation or motion or forces were required), a suitable motion sequence could be provided by the control system. It is important to note that these motion controls act on the motors 14, 18 directly, and thus indirectly influence the behavior of the BDOR clutch 22 according to its natural mechanical behavior, and do not act on the BDOR clutch 22 directly. The basic BDOR clutch 22 is a purely mechanical device, not an electro-mechanical device, although electrically actuated versions can be used.

Figure 6:
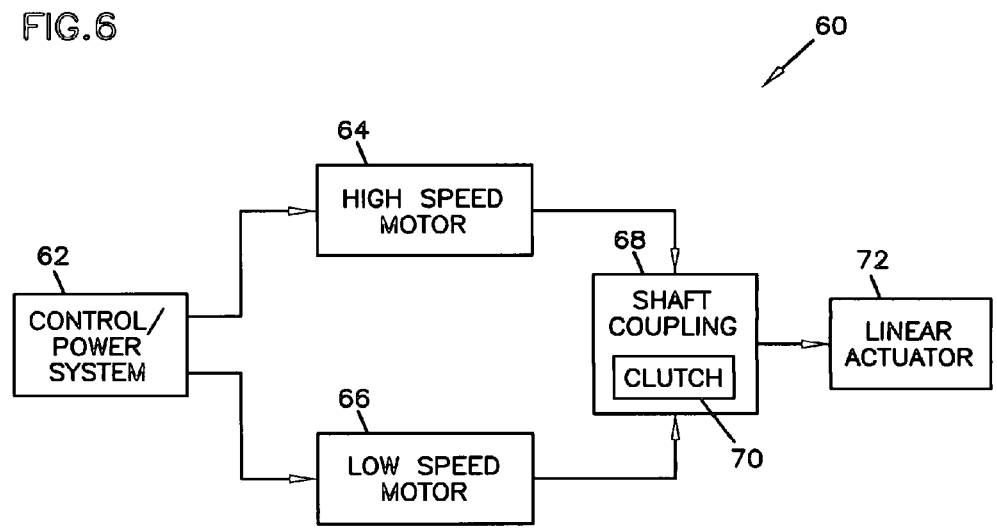
FIG. 6 is a functional block diagram of an example linear actuator system.

FIG. 6 is an example functional block diagram of a linear actuator system 60 according to the present disclosure. Linear actuator system 60 includes control system 62, high speed motor 64, high torque motor 66, shaft coupling 68, clutch 70, and linear actuator 72.

Control system 62 controls the operation of high speed motor 64 and high torque motor 66. To do so, control signals are generated by control system 62 that are independently transmitted to high speed motor 64 and high torque motor 66. Control system 62 generates control signals appropriate to control the respective motor. Alternatively, each of motors 64 and 66 has their own control system 62. In possible embodiments, digital control signals are generated by control system 62. Analog or pulse-width modulated signals are generated in other embodiments. In the illustrated embodiment, control system 62 also provides drive power to motors 64 and 66. Alternatively, a separate power source is provided. In another possible embodiment, control system 62 is a power source, or multiple power sources.

In the illustrated embodiment, linear actuator system 60 includes two rotary drive motors. As described herein, the rotary drive motors are controlled by control system 62. High speed motor 64 operates at high rpm but has a relatively low torque. In one embodiment, and by non-limiting example, high speed motor 64 operates with a peak speed in a range from about 2000 rpm to about 6000 rpm, and with a maximum continuous torque in a range from about 25 lbs-in to about 100 lbs-in. On the other hand, high torque motor 66 operates at low rpm but has a relatively high torque. In one embodiment, and by non-limiting example, high torque motor 66 operates with a peak speed in a range from about 200 rpm to about 600 rpm.

The rotary outputs from motors 64 and 66 are coupled by shaft coupling 68. In one embodiment, shaft coupling 68 is a belt drive, such as illustrated in FIG. 4. Alternatively, any other suitable shaft coupling may be used, including gear trains, rigid couplings, or flexible couplings.

Clutch 70 operates in cooperation with shaft coupling 68 to enable motors 64 and 66 to operate at different speeds, as described herein. For example, clutch 70 enables high speed motor 64 to provide the drive power to linear actuator 72 when a low load is applied to linear actuator 72. One example of a suitable clutch 70 is a bi-directional over-running clutch, but other suitable clutches may also be used. When the load on linear actuator 72 increases to the point that additional torque is required, clutch 70 enables low speed motor 66 to provide additional drive power. One exemplary embodiment of this configuration is illustrated in FIG. 4, but many other configurations may also be used. Some alternative configurations are illustrated in FIGS. 10 and 11.

Rotational drive power is converted into linear drive power by linear actuator 72. The coupled outputs of high speed motor 64 and low speed motor 66 provide the rotational drive power to an input shaft of linear actuator 72. In one embodiment, linear actuator 72 is a screw actuator.

In another possible embodiment, linear actuator 72 includes a motor. For example, high speed motor 64 is constructed within the enclosure of linear actuator 72. This is done by forming motor 64 around linear actuator 72, such that they share a common shaft. This is beneficial for reducing the length of the overall system, but increases the width. High torque motor 66 is coupled to the shaft via shaft coupling 68, such as a belt drive. Clutch 70 is connected between the shaft of low speed motor 66 and shaft coupling 68.

Figure 7:
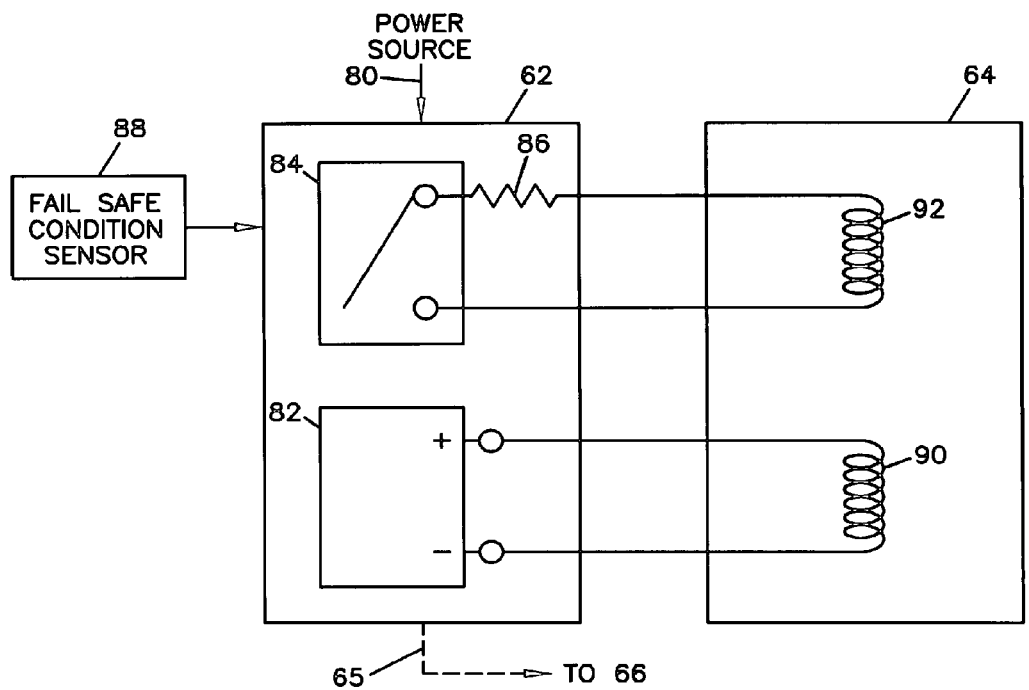
FIG. 7 is a schematic diagram illustrating an example embodiment of a dynamic braking system of the high speed motor of a linear actuator system.

FIG. 7 is an example schematic diagram illustrating another possible embodiment of control system 62 and high speed motor 64 including dynamic braking. It is sometimes desirable to stop a linear actuator system quickly. For example, in the case of a safety system trip, e-stop, or power loss it is desirable to stop the linear actuator as quickly as possible. It may be important or desirable in other situations to stop the linear actuator quickly, e.g., when the actuator or motor is moving quickly or when the application requires a fast response.

One method of stopping the linear actuator is to engage the clutch motor in a reverse direction. However, doing so can cause the system to stop too quickly, resulting in mechanical failure or overspeeding of the high torque motor. To solve this problem, a dynamic braking option is illustrated in FIG. 7. Dynamic braking utilizes the permanent magnet motor's self generated voltage to cause current flow in the winding to exhibit a braking effect. One of the benefits of dynamic braking over mechanical braking systems is that dynamic braking does not rely on friction between surfaces to provide force for braking, and therefore does not require maintenance to replace worn frictional surfaces.

In the illustrated embodiment, control system 62 includes power input 80, power supply 82, switch 84, and optional resistor 86. Fail safe condition sensor 88 is a safety or condition sensor which may be provided for an input to control system 62. High speed motor 64 includes first winding 90 and second winding 92. Power supply 82 is connected to the terminals of first winding 90. Switch 84 and resistor 86 are connected in series across the terminals of winding 92. Power to high torque motor 66 is shown designated at 65.

Continuing with this embodiment, high speed motor 64 includes first winding 90 and second winding 92. In one embodiment, the windings are wound together. In another embodiment, first winding 90 is wound first and second winding 92 is wound on top of first winding 90. In another embodiment, first winding 90 is wound adjacent to second winding 90. For example, each winding is wound on a separate portion of the motor armature.

During normal operation, control system 62 receives power through power input 80 from a power source. In one embodiment, the power source is alternating current power supplied to power input 80. In another embodiment, the power source is a direct current power source, such as a battery, that supplies power to power input 80. Any other power source may also be used.

Power is supplied to first winding 90 through power supply 82 to operate high speed motor 64. Switch 84 is maintained in an open state during operation of motor 64, such that little resistance is generated. When dynamic braking is desired, power supply 82 is turned off and switch 84 is closed, causing current to flow. An electromotive force is generated that opposes the rotation of motor 64 and causes motor 64 to rapidly decelerate until it has come to a complete stop. Resistor 86 may be placed in series with the winding 92 in order to improve the braking time of the high speed motor 64.

In one embodiment, switch 84 is a high speed relay. In embodiments in which it is desirable to stop the linear actuator upon power loss or when the linear actuator is turned off, a normally closed high speed relay is used. In this way, when power is lost, switch 84 automatically closes to initiate the dynamic braking feature. In such embodiments, control system 62 maintains relay 84 in an open state during normal powered operation. In another embodiment, current generated by the rotating motor windings is used to power switch 84 during braking.

In another embodiment, dynamic braking is initiated by control system 62 when a signal is received from fail safe condition sensor 88 or some other external control signal from a cooperating system (e.g., in a production line with other controllers). In one embodiment, fail safe condition sensor 88 is a temperature sensor. In another embodiment, fail safe condition sensor 88 may include a proximity sensor (e.g., to help promote safety of operators) and/or a part misfeed sensor (e.g., to protect tooling and to promote quality). Fail safe condition sensor 88 generates a signal that is input into control system 62 to cause control system 62 to initiate dynamic braking. Alternatively, fail safe condition sensor 88 generates a condition signal that is monitored by control system 62. If a condition signal exceeds a threshold value, control system 62 initiates dynamic braking. For example, if a temperature exceeds a safe operating temperature, control system 62 initiates dynamic braking to avoid overheating motor 64.

As noted above, resistor 86 is optional, as braking will occur with or without resistor 86. However, the resistance of resistor 86 may be set to adjust the speed at which dynamic braking occurs. The resistor 86 value for producing the fastest braking time is that which makes the electrical time constant of the motor to be substantially less than the mechanical time constant. Depending on the characteristics of the system and the motor, a higher resistance could well be needed to stop the motor quickly. This is because the electrical time constant equals L/R (motor inductance divided by resistance). The resistance is needed to dissipate the electrical energy of the winding such that the dynamic mechanical braking can occur quickly. In one embodiment, resistor 86 has a resistance in a range from about 0.5 ohms to about 1.0 ohms. It will be appreciated, however, that other values may be used depending on the motor characteristics and winding in which resistor is employed. Another alternative to a discrete resistor in the case of a dual winding as shown in FIG. 7 is to wind the brake winding 92 with wire of the appropriate size to provide the desired resistance.

Figure 8:
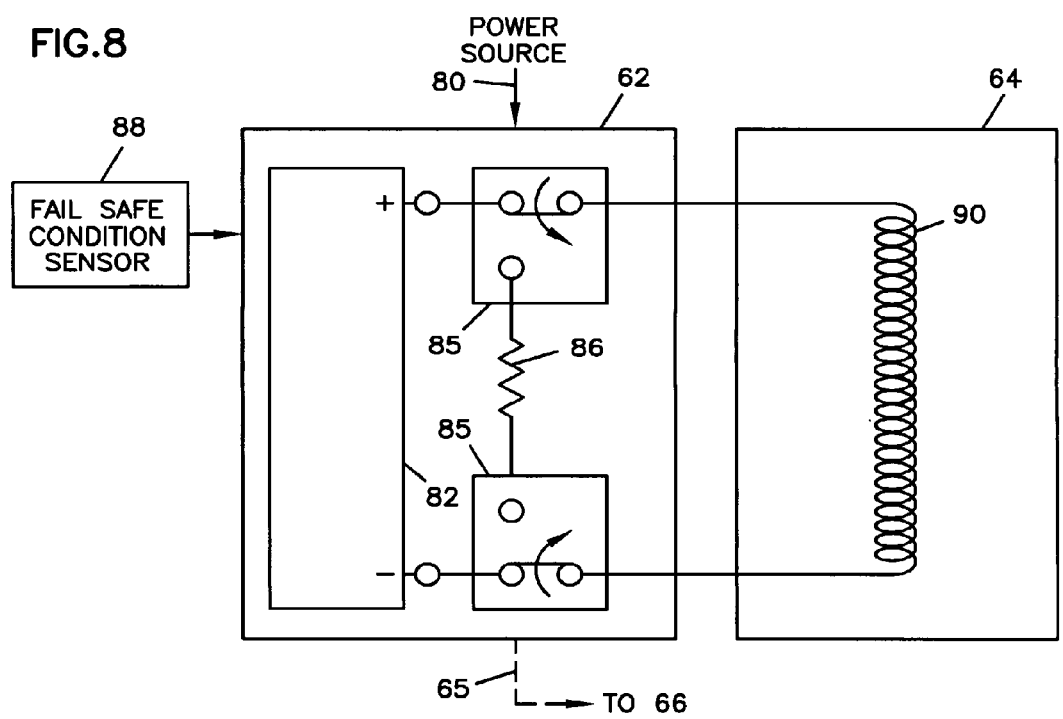
FIG. 8 is a schematic diagram illustrating an alternative embodiment of a dynamic braking system of the high speed motor of a linear actuator system.

It may be noted that the embodiment illustrated in FIG. 7 may require a specially built motor for the second brake winding 92. FIG. 8 illustrates an alternative embodiment in which a standard high speed motor 64 may be employed. In this embodiment, the brake winding 92 is eliminated by utilizing the motor winding 91 as both windings. In this case, a switch 85 is used to switch between a normally powered and a braking position. In other words, switch 85 may be used to connect to the power supply 82 during normal operation. When braking is to occur, the winding would be disconnected from the power supply and connected across resistor 86. This may be accomplished, for example, with a single throw, double pole switch.

Those of skill in the art will appreciate that the windings illustrated in FIGS. 7 and 8 are for illustrative purposes only. The actual windings of the motors are based on the type and style of the motor.

In possible embodiments, high speed motor 64 is a permanent magnet motor with a self limiting current characteristic that prevents the motor from generating excessively high currents that could otherwise demagnetize the rotor magnets. The limiting current is a function of the motor Ke, pole count and winding inductance. The maximum current generated is equal to about $2 \times Ke/P*L$. In addition, as noted above, the mechanical and electrical time constants play a role in the braking of the motor, whereby it is desirable to reduce the electrical time constant to a value significantly less than the mechanical time constant to provide improved braking effect.

In an alternate embodiment, dynamic braking may also be performed using a single winding motor by shorting the terminals of the motor winding together, with or with out a resistor. In another embodiment, a separate stator or a separate motor is provided to perform the dynamic braking operation.

The physical arrangement of the two motors, clutch and the actuator of the present invention may take several forms. FIGS. 10A-10D provide several block diagrams illustrating alternative embodiments of the arrangement of the dual motor, linear actuator system according to the present disclosure.

Figure 10A:
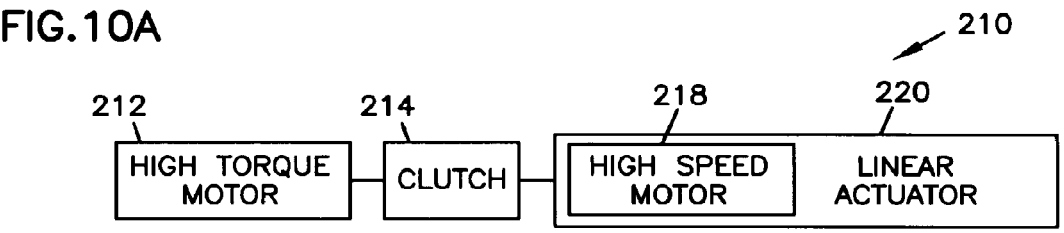
FIG. 10A is a block diagram of an example dual motor linear actuator system.

FIG. 10A is an example block diagram of linear actuator system 210 including high torque motor 212, clutch 214, high speed motor 218, and linear actuator 220. In this embodiment, all components are generally aligned along a common axis. Clutch 214 is connected between high torque motor 212 and the rotary end of linear actuator 220. High speed motor 218 is formed integral to linear actuator 220 as described herein.

One of the benefits of this embodiment is that it provides for a narrow design because all components are generally aligned along a common axis.

Figure 10B:
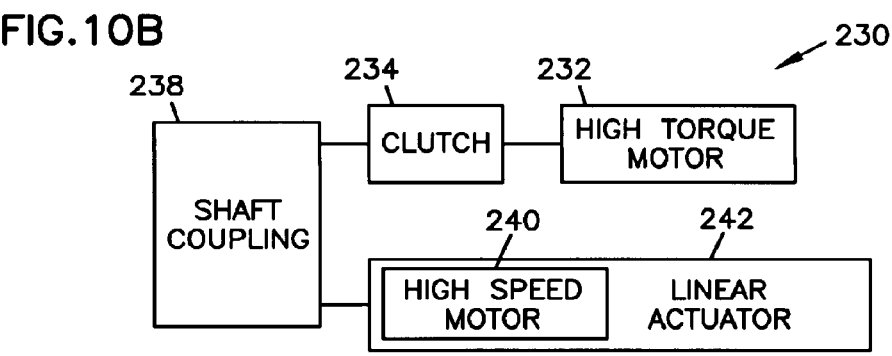
FIG. 10B is a block diagram of another example dual motor linear actuator system.

FIG. 10B is an example block diagram of linear actuator system 230 including high torque motor 232, clutch 234, shaft coupling 238, high speed motor 240, and linear actuator 242. Clutch 234 is connected between high torque motor 232 and one end of shaft coupling 238. The other end of shaft coupling 238 is connected to a rotary input of linear actuator 242. High speed motor 240 is formed integral to linear actuator 220 as described herein. One of the benefits of this embodiment is that is shorter than the embodiment illustrated in FIG. 10A.

Figure 10C:
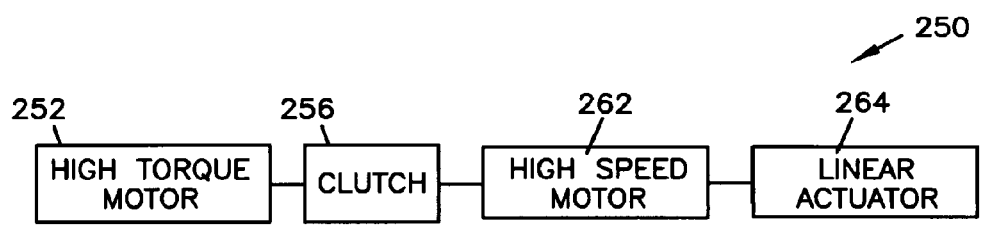
FIG. 10C is a block diagram of a third example dual motor linear actuator system.

FIG. 10C is an example block diagram of linear actuator system 250 including high torque motor 252, clutch 256, high speed motor 262, and linear actuator 264. High torque motor 252 is connected to the input shaft of clutch 256. The output of the clutch 256 is connected to a discrete high speed motor 262. The output of the high speed motor 262 is connected to linear actuator 264. One of the benefits of this embodiment is that it provides flexibility of the motor selection.

Figure 10D:
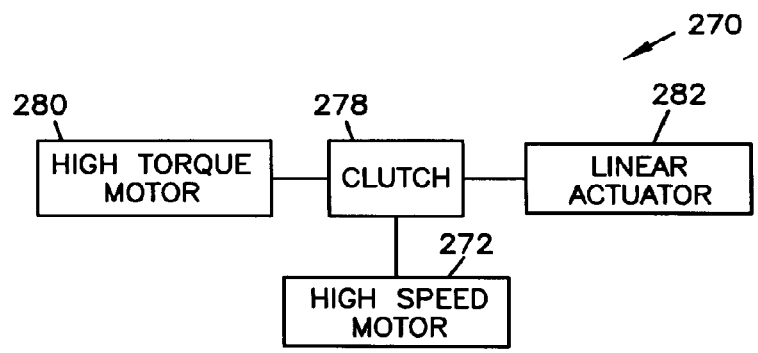
FIG. 10D is a block diagram of a fourth example dual motor linear actuator system.

FIG. 10D is an example block diagram of linear actuator system 270 which generally illustrates the system 10 shown in FIGS. 1-5. This system 270 includes a high speed motor 272, clutch 278, high torque motor 280, and linear actuator 282. One end of a shaft coupling provides for the high speed motor 272 to be connected to the clutch 278 (e.g., belt and pulley, gear and drive chain, meshing gears, etc.). The output of the clutch 278 is connected to the linear actuator 282 which generally shares a common axis. The input to the clutch 278 is the high torque motor 280.

Figure 11A:
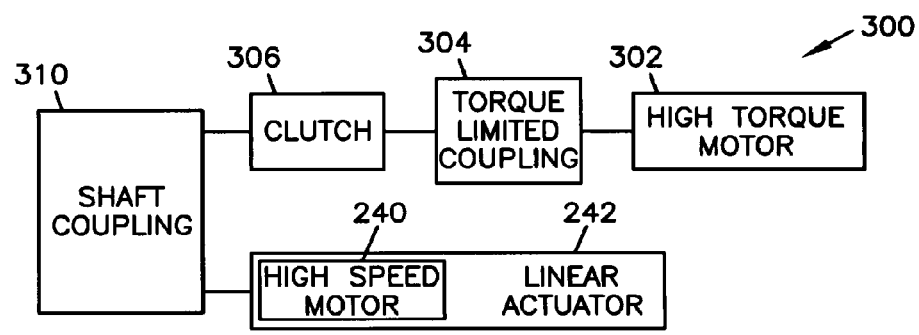
FIG. 11A is a block diagram of an example linear actuator system including a torque limited coupling.
Figure 11B:
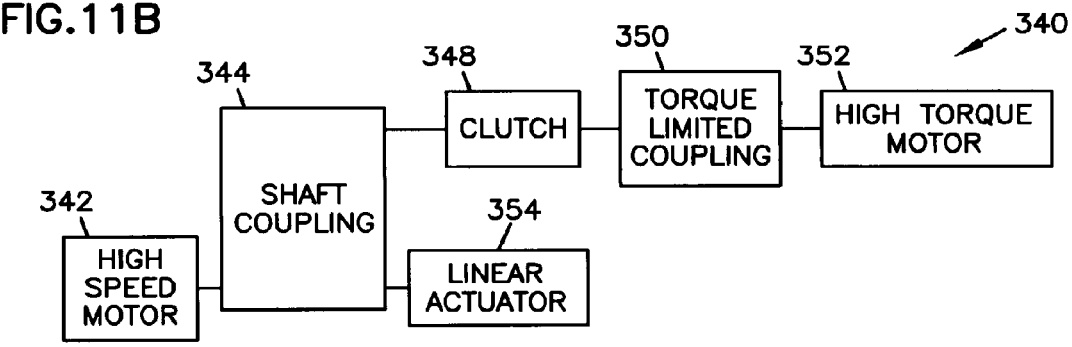
FIG. 11B is a block diagram of an alternative linear actuator system including a torque limited coupling.

FIGS. 11A and 11B provide illustrations of an alternative embodiments in which torque limited couplings are employed. Torque limited coupling may be used in these and other embodiments as an alternative to the dynamic braking, or may be used in conjunction with dynamic braking.

One of the benefits of using a torque limited coupling is that it provides offers protection to the high torque motor. For example, in the event that the over-running clutch is engaged at the wrong time, the rapidly moving linear actuator may attempt to backdrive the high torque motor at very high speed. This could result in damage to the high torque motor due to the sudden and possibly excessive torque that would be applied. A torque limited coupling solves this problem by providing a limit to the torque that can be applied.

A first type of torque limited coupling is commonly called a "slip clutch" ("TLC-S"). This type of clutch transmits torque between a driving shaft and a driven shaft up to a settable threshold—after which it slips. However, when slipping, it still transmits a torque approximately equal to the torque at which it slips, even though the driven shaft would be turning slower than the driving shaft. When the transmitted torque reduces below this amount, it stops slipping. The TLC-S can be symmetrical, that is either shaft can act as the driving or driven shaft, with the other shaft acting with the driven or driving function respectively, depending on the instantaneous dynamics of the shafts.

A second type of torque limited coupling is one that snaps open, and is commonly referred to as a "free wheeling torque limited coupling" ("TLC-FW"). These types of clutches transmit torque between a driving and a driven shaft without slipping until a settable torque limit is reached, at which point they snap open, and the driven shaft is disengaged from the driving shaft allowing both to free wheel. This mode of operation typically continues until the system is brought to a standstill, and the coupling is manually reset. There are many variations of this type of coupling. Some will reset after a particular shaft position is reached, or a particular shaft motion sequence occurs, and some can be electrically actuated.

Both types of torque limited coupling can protect the high torque motor from damage, should the clutch be engaged (purposefully or accidentally) when the actuator is moving at high speed. If this happens, the inertia of the actuator will tend to back drive the high torque motor. This can damage the motor. For example, if the high torque motor was a gear motor with a 10:1 reduction, with a normal output shaft speed of 200 rpm, and the high speed motor was running at 3,000 rpm, then if the BDOC clutch were suddenly engaged the system would try to turn the high torque motor at 30,000 rpm (10×3,000 rpm). While a simple energy balance shows that an ultimate speed of 30,000 rpm will not be achieved, it does point out why a large torque pulse could occur. A torque limited coupling (either TLC-S or TLC-FW type) placed between the high torque motor and the BDOC will protect the high torque motor from this source of potentially damaging torque.

For example, a torque limited coupling may be used in conjunction with dynamic braking from the high speed motor. In one form, the high torque motor can be operated to rotate slowly, in the direction opposite that of the high speed motor, thereby suddenly engaging the BDOC. This now presents the near zero speed inertia of the high torque motor into the system, as an impediment to continued motion of the high speed motor. This could create a huge torque pulse on the high torque motor, but a TLC placed between the BDOC and the high torque motor will protect it.

If the TLC is the TLC-S type, the high torque motor power train will be protected from damaging torque, and yet be able to transmit a braking torque to the high speed motor. In this case, the limiting torque of the TLC-S would be set below a torque that would cause damage to the high torque motor, were it to be otherwise urged to be back driven suddenly and at high speed, and yet set at a high enough torque that the high torque motor can exert most or all of its normal holding torque on the BDOC input shaft, regardless of its actual speed. In this fashion, the energy of the system could be partially dissipated by friction in the TLC-S, and rapidly slowed to the near zero speed of the high torque motor. This in turn could be brought to zero speed by the control system (servo drive motion controller, etc—any means that would otherwise bring the high torque motor to a standstill).

Using a TLC-S in conjunction with the high torque motor might be used to shorten the total braking distance for the linear actuator, when dynamic motor braking is used. Alternatively, it could be used alone without dynamic motor braking. The energy dissipated in friction by the TLC-S was in one example calculated to increase the temperature of the TLC-S by 1.5 Deg F. (based on total system mechanical energy, and total mass of the TLC-S), so this may be a practical means for occasional emergency braking. However, the TLC-S is also a maintenance item, since it depends on friction, and thus wear of the friction surfaces occurs over time. Dynamic motor braking is likely to be more reliable for long term use.

Turning now to FIG. 11A an example block diagram of linear actuator system 300 including high torque motor 302, torque limited coupling 304, clutch 306, shaft coupling 310, high speed motor 240, and linear actuator 242. Torque limited coupling 304 is connected between high torque motor 302 and clutch 306. The clutch is connected to one end of shaft coupling 310. The other end of shaft coupling 310 is connected to high speed motor 240. The linear actuator 242 includes an integral high speed motor 240.

FIG. 11B is an example block diagram of linear actuator system 340 including high speed motor 342, shaft coupling 344, clutch 348, torque limited coupling 350, high torque motor 352, and linear actuator 354. One end of shaft coupling 344 is connected between high speed motor 342 and linear actuator 354. The other end of shaft coupling 344 is connected to clutch 348. Torque limited coupling 350 is connected between clutch 348 and high torque motor 352.

The alternative embodiments illustrated in and described with reference to FIGS. 7, 8, 10, and 11 are only some examples of the many alternative embodiments within the scope of this disclosure. These examples are not intended to encompass all possible examples, but rather to illustrate some of the many available embodiments. Other embodiments will be readily apparent to one skilled in the art after a careful review of this disclosure.

While particular embodiments of the invention have been described with respect to its application, it will be understood by those skilled in the art that the invention is not limited by such application or embodiment or the particular components disclosed and described herein. It will be appreciated by those skilled in the art that other components that embody the principles of this invention and other applications therefore other than as described herein can be configured within the spirit and intent of this invention. The arrangement described herein is provided as only one example of an embodiment that incorporates and practices the principles of this invention. Other modifications and alterations are well within the knowledge of those skilled in the art and are to be included within the broad scope of the appended claims.

What is claimed is:

1. A linear actuator system comprising:
   a linear actuator configured to transmit rotational motion to linear motion;
   a first motor operatively connected to the linear actuator; and
   a second motor operatively connected to the linear actuator, wherein the first motor is configured to selectively provide a different amount of force and a different speed to the linear actuator than the second motor.

2. A system according to claim 1, wherein the first and second motors are connected to the linear actuator through a transmission.

3. A system according to claim 2, wherein the transmission includes a bidirectional over-running clutch with a high speed input and a low speed input, wherein the first motor is connected to the linear actuator through the low speed input of the clutch and the second motor is connected to the linear actuator through the high speed input of the clutch.

4. A system according to claim 1, wherein the first motor and the second motor operate at the same time.

5. A system according to claim 1, wherein the linear actuator is bidirectional.

6. A system according to claim 1, wherein the first motor and the second motor operate interchangeably based on an outside load encountered by the linear actuator, wherein the interchangeable operation of the first and the second motors happens automatically.

7. The system according to claim 1, wherein the second motor is a high speed motor.

8. The system according to claim 1, further comprising a torque limited coupling operatively connected to the high torque motor.

9. The system according to claim 1, wherein at least one of the first and second motors further comprise a first winding and a second winding.

10. The system according to claim 9, further comprising a switch operatively connected to the second winding to generate a dynamic braking force with the second winding.

11. The system according to claim 1, wherein at least one of the first and second motors further comprise a winding and further comprising a switch operatively connected to the winding to generate a dynamic braking force with the winding.

12. The system according to claim 1, wherein the linear actuator is a rotary to linear type actuator.

13. The system according to claim 12, wherein the rotary to linear actuator is a screw type.

14. The system according to claim 13, wherein the screw type rotary to linear actuator is a roller screw type.

15. A method of operating a linear actuator configured to transmit rotational motion to linear motion, the method comprising the steps of:
   operatively connecting a first motor to the linear actuator; and
   operatively connecting a second motor to the linear actuator, wherein the second motor is configured to selectively provide a different amount of force and a different speed to the linear actuator than the first motor.

16. A method according to claim 15, further comprising the step of operatively connecting to the first motor and the second motor to the linear actuator through a transmission.

17. A method according to claim 16, wherein the transmission includes a bidirectional over-running clutch.

18. A method according to claim 15, wherein the first and second motors operate the linear actuator interchangeably based on an outside load encountered by the linear actuator, wherein the interchangeable operation occurs automatically.

19. A linear actuator system comprising:
   means for generating a first rotational torque having a first speed;
   means for generating a second rotational torque having a second speed; and
   means for transforming the first and second rotational torques into a linear force.

20. The linear actuator system of claim 19, further comprising means for stopping the linear force.

21. The linear actuator system of claim 20, further comprising means for detecting a condition to indicate the need for stopping the linear force.

22. The linear actuator system of claim 19, wherein the means for generating first and second rotational forces comprise electric motors.

23. The linear actuator system of claim 19, wherein the means for transforming the first and second rotational forces into linear forces comprise a shaft coupling.

24. The linear actuator system of claim 23, wherein the means for transforming the first and second rotational forces into linear forces further comprises a clutch connected between one of the first and second motors and the shaft coupling.

* * * * *